United States Patent [19]
Scollo

[11] Patent Number: 6,081,184
[45] Date of Patent: Jun. 27, 2000

[54] SELF-PROTECTED, LOW EMISSION ELECTRONIC DEVICE FOR DRIVING A WARNING HORN

[75] Inventor: Rosario Scollo, Misterbianco, Italy

[73] Assignee: SGS-Thomson Microelectronics S.r.l., Agrate Brianza, Italy

[21] Appl. No.: 09/028,738

[22] Filed: Feb. 24, 1998

[30] Foreign Application Priority Data

Feb. 25, 1997 [IT] Italy .................................. MI970399

[51] Int. Cl.[7] .................................................. G08B 3/10
[52] U.S. Cl. .............................. 340/384.73; 340/388.1; 340/388.7; 340/393.3
[58] Field of Search ......................... 340/384.73, 388.1, 340/388.2, 393.3, 388.7, 398.2; 116/24, 59, 137 R, 142 R

[56] References Cited

U.S. PATENT DOCUMENTS

| | | | |
|---|---|---|---|
| 3,618,079 | 11/1971 | Denning et al. | 340/388.1 |
| 3,624,646 | 11/1971 | Weiss | 340/393.3 |
| 3,735,311 | 5/1973 | Sloan, Jr. | 340/388.7 |
| 4,075,624 | 2/1978 | Sheff | 340/384.73 |
| 4,170,769 | 10/1979 | Morris et al. | 340/388.1 |
| 4,871,991 | 10/1989 | Noda et al. | |
| 5,049,853 | 9/1991 | Yoon | |
| 5,109,212 | 4/1992 | Cortinovis et al. | |
| 5,293,149 | 3/1994 | Wilson et al. | |
| 5,457,437 | 10/1995 | Kim | |

OTHER PUBLICATIONS

Graf, et al, Encyclopedia of Electronic Circuits. vol. 4, p. 427, 1992.

Primary Examiner—Daniel J. Wu
Assistant Examiner—John Tweel, Jr.
Attorney, Agent, or Firm—Theodore E. Galanthay; Allen, Dyer, Doppelt, Milbrath & Gilchrist, P.A.

[57] ABSTRACT

A self-protected, low emission electronic device for driving a warning horn includes a coil powered from a battery through a control push-button adapted for operation by a user and included in an electric connection between a terminal of the coil and the battery. The device includes a protective circuit portion connected between the battery and the warning horn. The protective circuit portion includes a bridge structure of power components. At least a pair of the power components are MOS power transistors of which one is driven by a charge pump.

35 Claims, 2 Drawing Sheets

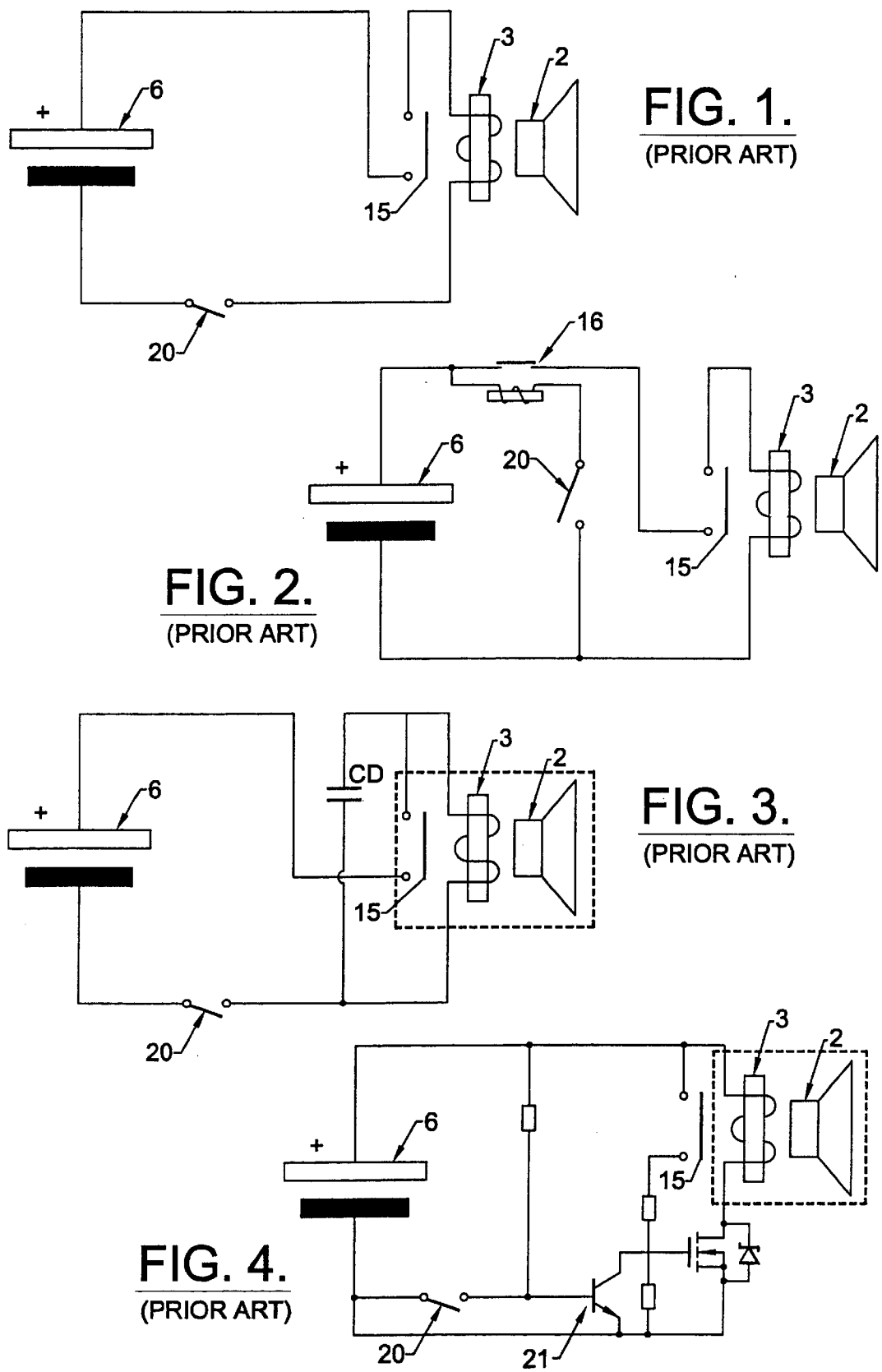

SELF-PROTECTED, LOW EMISSION ELECTRONIC DEVICE FOR DRIVING A WARNING HORN

FIELD OF THE INVENTION

This invention relates to a self-protected, low emission electronic device for driving a warning horn. More particularly, the invention relates to such a device, which is effective to reduce electromagnetic emissions and recover inductive energy. The description which follows will make reference to this specific field of application for convenience of illustration only.

BACKGROUND OF THE INVENTION

As is well known, state-of-art warning horns are mostly built around a simple series connection of a coil and a breaker inside the warning horn. The breaker is controlled from the coil through a battery power supply. Warning horns of this kind produce electromagnetic emissions in considerable amounts. In fact, their working frequency in the power-on condition is about 400–500 Hz, and their sound emission is accompanied by electromagnetic emissions due to the interruption of inductive currents. The currents flowed through warning horns powered at 12 V may be as large as 8–9 Amperes.

There exists a European Community (E.C.) Standard 95/54 of Nov. 11, 1995 aimed at keeping electromagnetic emissions within bounds. Warning horns of the above type do not fall within the limits provided by that standard. Thus, there is a need for warning horns or horns which would conform with the restrictions enforced by the standards for electromagnetic emissions.

The state-of-the-art provides some approaches for implementing warning horn drivers. A first approach is shown in the accompanying FIG. 1, wherein the warning horn 2 is operated by means of a push-button 20, when small supply currents are provided. FIG. 2 shows a similar approach, wherein the warning horn 2 is operated through an electromagnetic or electronic relay 16, in the instance of large currents being supplied.

The horn operation is the same in either cases. Upon the supply current to the breaker 15 reaching its largest value, the normally closed breaker opens and interrupts an electric connection, at a working frequency equal to the resonance frequency of the device. This frequency can be calibrated to a selected value in the 400 to 500 Hz range. The breaker is expected to also cut off an inductive current of as much as 8 or 9 A dissipating an inductive energy of about 36 mJ per cycle. In power terms, the dissipation amounts to 14 to 18 W in the instance of a horn operated at 12 V.

As previously mentioned, the most serious aspect of the problem is related to the need for reducing the electromagnetic noise emission from the arcing produced during the interruptions of the inductive current flow, more so than to the dissipation of power.

FIG. 3 shows a third approach wherein a non-electrolytic capacitor is connected in parallel with the breaker. This capacitor may have a capacitance of a few microfarads, and can store up all of the inductive energy emitted as the breaker opens. Thus, the breaker will open with no arcing being produced, but a serious problem is encountered as the breaker then closes to connect the capacitor to the battery supply. These two components have radically different voltages, and when connected in parallel, cause oscillations with current spikes of up to 50 A. Accordingly, this third approach neither solves the problems created by electromagnetic disturbance nor those related to energy dissipation.

The state-of-the-art provides a fourth approach directed to reducing electromagnetic noise. This fourth approach comprises an electronic power switch driven from the breaker, according to the diagram of FIG. 4. While in many ways advantageous, not even this approach is devoid of problems, due to the large amount of power that must be dissipated through the driver circuit. In fact, the inductive energy will be discharged to the power switch, and the latter must be provided with a large-size dissipator complete with a voltage clamping device. In any case, this approach requires a dissipating element, represented here by the power switch coupled to a large-size dissipator.

SUMMARY OF THE INVENTION

In view of the foregoing background, it is therefore an object of the present invention to provide a self-protected, low emission device, particularly for driving warning horns, which has such structural and functional features to substantially suppress the arcing and recover the normally dissipated inductive energy.

The present invention provides a first protective circuit portion in the form of a bridge configuration of power components. The circuit may optionally include a second protective circuit portion for protection against reversal of the supply battery polarity.

The protective circuit portion may include a pair of power MOS transistors and a pair of power diodes. One of the power transistors may be a power transistor of the OMNIFET type comprising an intrinsic Zener diode across source and drain terminals. The power diodes are preferably effective to recover the inductive energy released at each coil switching. A charge pump may be provided for driving at least one of the MOS power transistors.

In addition, the warning horn may further include a breaker operatively connected to the coil. Accordingly, one of the MOS power transistors may have a control terminal for connection to the breaker, and another one of the MOS power transistors may have a conduction terminal for connection to the coil.

The device may further comprise a second circuit portion for connection between the battery and the first circuit portion to provide protection against reversal of battery polarity. The second circuit portion may include at least one power transistor connected between a negative terminal of t battery and the first circuit portion.

BRIEF DESCRIPTION OF THE DRAWINGS

The features and advantages of the device according to the invention will be apparent from the following description of an embodiment thereof, given by way of non-limiting example with reference to the accompanying drawings. In the drawings:

FIG. 1 to 4 are respective diagrammatic representations of drivers for warning horns, according to the prior art.

DETAILED DESCRIPTION OF THE PREFERRED EMBODIMENTS

Figure 5:
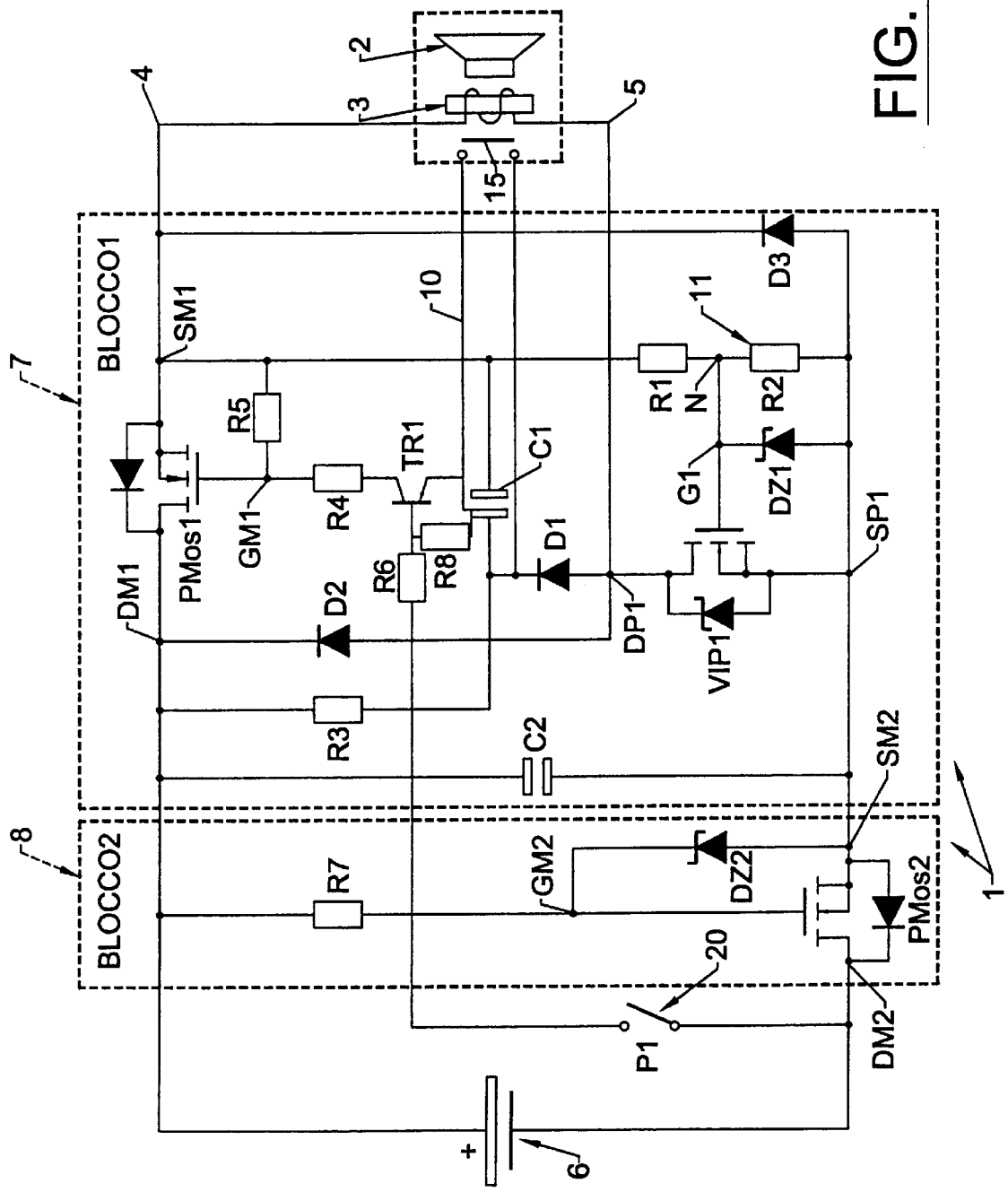
FIG. 5 is a diagrammatic representation of a protective driver for a warning horn in accordance with the present invention.

Referring to the drawing figures, generally and schematically shown at 1 is a self-protected, low emission electronic device for driving a warning hooter or horn 2. The warning horn is represented diagrammatically in FIG. 5 by a speaker symbol and comprises an electromagnetic induction coil 3. The coil 3 includes a central core, a breaker 15 which corresponds essentially to a moving contact, and an inductive winding having first 4 and second 5 terminals. The breaker 15 opens and closes an electric connection 10 according to the excitation state of the coil 3.

The first terminal 4 of the winding is connected to the positive pole of a DC supply battery 6. More particularly, this terminal 4 is connected to the battery 6 via a first switch, represented by a power transistor Pmos1 of the N-channel MOS type, whose operation will be made clear hereinafter. Advantageously in this invention, the driver 1 is connected between the battery 6 and the coil 3 of the warning horn 2. A smoothing capacitor C2 is placed in parallel with the supply 6.

The device 1 comprises a first, protective circuit portion 7 and a second, energy-recovering circuit portion 8. The two portions 7 and 8 are interconnected, but the second circuit portion 8 is optional in the sense that the device 1 could perform as expected even without the second portion 8. The first circuit portion 7 includes a resistive divider 11 formed of a pair of resistors R1 and R2 connected between the first terminal 4 of the coil 3 and the negative pole of the battery 6 which can be equated to a virtual ground. A power diode D3, forward biased to ground, is provided in parallel with the divider 11.

Placed between the resistors R1 and R2 is an interconnection node N whereto the control or gate terminal Gi of a second switch, represented by a power transistor VIP1 of the NMOS type, is connected. A Zener diode DZ1 is provided, between the drain DP1 and gate G1 terminals of that transistor VIP1, which is connected in parallel with the resistor R2 of the divider 11.

The transistor VIP1 has an intrinsic Zener diode across its drain DP1 and source SP1 terminals. Advantageously, the transistor VIP1 is a type designated OMNIFET by the assignee of the present invention, to inherently provide the transistor with thermal protection and protection from possible short-circuits. The drain terminal DP1 of that transistor VIP 1 is connected to the second terminal 5 of the coil 3. The second terminal 5 of the coil 3 is also connected to the positive pole of the battery 6 through a power diode D2 which is forward biased to the terminal 5. The transistor Pmos1 has its source terminal SM1 connected to the first terminal 4 of the coil 3 and to the divider 11.

It is important to note that the power components represented by the diodes D2, D3 and the transistors VIP1 and Pmos1 form a bridge connection structure wherein the power diodes are opposite each other, as are the power transistors with respect to each other. The transistor Pmos1 has its source SM1 and gate GM1 terminals interconnected by a resistor R5, and has an intrinsic diode across its drain DM1 and source SM1 terminals. One end of the conductive path 10, comprising a series of a resistor R4, a bipolar transistor TR1 of the PNP type, and the breaker 15, is taken to the gate terminal GM1 of the transistor Pmos1.

The bipolar transistor TR1 has a control terminal connected toward ground through a series of a resistor R6 and a push-button 20 made available to the user for operating the warning horn 2. A resistor R8 is provided between the base and emitter terminals of the transistor TR. In addition, a diode D1 is connected between the breaker 15 and the drain terminal DP1 of the power transistor VIP1. The diode D1 is further connected to the second terminal 5 of the coil 3 and is forward biased to the terminal.

The structure of the circuit portion 7 is completed by a capacitor C1 connected between the divider 11 and the diode D1. The end of the capacitor C1 which is connected to the diode D1 is also connected to the drain terminal DM1 of the transistor Pmos1 via a resistor R3. The diode D1 and capacitor C1 form a charge pump for the power transistor Pmos1 which requires for its operation a voltage signal boosted by approximately 10V with respect to the power supply value, itself of approximately 12V.

The device 1 may optionally include the second circuit portion 8, which is connected between the battery and the first circuit portion 7. This portion 8 includes a power transistor Pmos2 of the N-channel MOS type, connected between the negative pole of the battery 6 and the first circuit portion 7. An intrinsic diode exists between the drain DM2 and source SM2 terminals of that transistor, and between the source SM2 and gate GM2 terminals is a Zener diode DZ2 forward biased to the source terminal SM2. The circuit portion 8 is completed by a resistor R7 connected between the gate terminal GM2 and the positive pole of the battery 6. This circuit portion 8 provides protection against reversal of the battery connection, and in a situation of correct polarity, allows current to pass bi-directionally as required for inductive energy recovery.

The operation of the inventive device will now be described. The conductive path through the resistor R3, capacitor C1, and resistive divider 11 allows the capacitor C1 to be charged. A user wishing to operate the warning horn 2 will depress the push-button 20, thereby applying the voltage present across the capacitor C1 to the gate terminal GM1 of the transistor Pmos1, via the resistor R4. This turns on the transistor Pmos1 and, through the divider 11, results in a sufficient gate voltage being applied to turn on the transistor VIP1. Thus, a current begins to flow through the coil 3 which will rise to a predetermined value whereat the breaker 15 is operated to interrupt the conductive path 10.

At this point, the voltage across the resistor R5 turns off the transistor Pmos1, whose source terminal SM1 will be brought to a value of –1V by an inductive effect impressed by the coil 3, and held approximately at the value of –1V by the diode D3. This causes the transistor VIP1 to be also turned off. The inductive current in the circuit portion 7 is returned to the battery 6 through the diodes D2 and D3. Concurrently therewith, a proportion of that current will restore the capacitor C1 charge through the diode D1, and the device 1 is now ready for a new working cycle. Thus, part of the energy recovered will also serve to drive the first power transistor Pmos1.

The breaker 15 sets the highest resonance frequency of the electromechanical system, and can be regarded as forming a part of the charge pump represented by the capacitor C1 and the diode D1 for the transistor Pmos1. The breaker 15 dimensions can be quite small, since the breaker is only required to interrupt resistive currents of no more than 100 mA.

The first power transistor VIP1 has an intrinsic resistance which is equivalent to that of the second transistor Pmos1. Accordingly, in view of that both of these power devices are operated in series and dissipate the same amount of power, the thermal protection incorporated to the transistor VIP1 of the OMNIFET type is automatically extended to protect the whole device. In addition, any combined thermal action with the capacitor C1 discharge, that in this case receives no energy restoration, would latch the oscillation until the push-button 20 is released. The transistor VIP1 is also active against a possible short-circuiting of the coil 3, since the intrinsic current limitation thereto would cause the thermal protection to perform in the same way as previously described.

In warning horns, the breaker 15 is likely to become temporarily blocked when high temperatures are reached. This normally results in a burned coil winding, if the control push-button 20 is not released. The device of this invention provides protection against this event as well. In fact, with the breaker 15 blocked, the capacitor C1 would be discharged within approximately ten milliseconds and force the oscillation to stop by the transistors Pmos1 and VIP1 being in the off state.

As for the second circuit portion 8, it should be noted that the device of this invention would be unable to provide protection against reversal of the battery polarity by the mere inclusion of a diode in series with the power supply. This approach would hinder the recovery of inductive energy. Accordingly, the second circuit portion 8 can selectively be connected, where such protection is needed.

With the correct polarity, the intrinsic diode of the transistor Pmos2 is forward biased, and the MOS channel conducting. In this condition, the bi-directional passage of current is admitted. Conversely, where the polarity of the battery 6 is reversed, the intrinsic diode becomes reverse biased and the channel of the transistor Pmos2 is turned off.

The device of this invention does solve the technical problems and affords several advantages, foremost among which is the fact that it can drastically cut down electromagnetic emissions. Furthermore, the inductive energy released by the electromagnetic coil can be fully recovered.

Additional advantages are the thermal protection, and protection from short-circuits, provided for the device as a whole by one of the power components incorporated thereto. This protection also covers possible short-circuiting of the coil, whose occurrence is prevented by limiting the largest current which is allowed to flow through the devices connected thereto. In view of the indirect protection provided for the breaker block, the possibility of using small-size breakers, and the protection against battery reversal, the device of this invention will prove highly useful and far ahead of the approaches proposed by the prior art.

That which is claimed is:

1. A self-protected, low emission electronic device for driving a warning horn of a type comprising a coil powered from a battery through a control switch for operation by a user and included in an electrical connection between a terminal of the coil and the battery, the device comprising:
   a thermal protective circuit portion for connection between the battery and the warning horn for providing thermal protection by momentarily interrupting operation of the warning horn until excessive temperatures therein have dissipated;
   said thermal protective circuit portion comprising a bridge structure of power components.

2. A device according to claim 1, wherein at least one of said power components comprises means for thermal protection.

3. A device according to claim 2, wherein said at least one of said power components comprising means for thermal protection comprises a power transistor of the OMNIFET type comprising a Zener diode across source and drain terminals.

4. A device according to claim 1, wherein at least one pair of said power components are MOS power transistors.

5. A device according to claim 4, further comprising a charge pump for driving at least one of said MOS power transistors.

6. A device according to claim 4, wherein said warning horn further includes a breaker operatively connected to the coil; wherein one of said MOS power transistors has a control terminal for connection to the breaker; and wherein another one of said MOS power transistors has a conduction terminal for connection to the coil.

7. A device according to claim 1, wherein at least a pair of said power components are power diodes.

8. A device according to claim 7, wherein said power diodes are effective to recover the inductive energy released at each coil switching.

9. A device according to claim 1, further comprising a second circuit portion for connection between the battery and said thermal protective circuit portion to provide protection against reversal of battery polarity.

10. A device according to claim 9, wherein said second circuit portion comprises at least one power transistor connected between a negative terminal of the battery and said thermal protective circuit portion.

11. A self-protected, low emission electronic device for driving a warning horn of a type comprising a coil powered from a battery through a control switch for operation by a user and included in an electrical connection between a terminal of the coil and the battery, the device comprising:
   a protective circuit portion for connection between the battery and the warning horn;
   said protective circuit portion comprising at least one pair of MOS power transistors and at least one pair of power diodes arranged in a bridge structure, said at least one pair of power diodes for recovering inductive energy released at each coil switching.

12. A device according to claim 11, wherein at least one of said MOS power transistors comprises means for thermal protection.

13. A device according to claim 12, wherein said at least one MOS power transistor comprising means for thermal protection comprises a MOS power transistor of the OMNIFET type comprising a Zener diode across source and drain terminals.

14. A device according to claim 11, further comprising a charge pump for driving at least one of said MOS power transistors.

15. A device according to claim 11, wherein said warning horn further includes a breaker operatively connected to the coil; wherein one of said MOS power transistors has a control terminal for connection to the breaker; and wherein another one of said MOS power transistors has a conduction terminal for connection to the coil.

16. A device according to claim 11, further comprising a second circuit portion for connection between the battery and said protective circuit portion to provide protection against reversal of battery polarity.

17. A device according to claim 16, wherein said second circuit portion comprises at least one power transistor connected between a negative terminal of the battery and said protective circuit portion.

18. A self-protected, low emission electronic device for driving a warning horn of a type comprising a coil powered from a battery through a control switch for operation by a user and included in an electrical connection between a terminal of the coil and the battery, the device comprising:
   a thermal protective circuit portion for connection between the battery and the warning horn, said thermal protective circuit portion comprising a bridge structure of power components for providing thermal protection by momentarily interrupting operation of the warning horn until excessive temperatures therein have dissipated; and a second circuit portion for connection between the battery and said thermal protective circuit portion to provide protection against reversal of battery polarity.

19. A device according to claim 18, wherein at least one of said power components comprises means for thermal protection.

20. A device according to claim 18, wherein at least one pair of said power components are MOS power transistors.

21. A device according to claim 20, further comprising a charge pump for driving at least one of said MOS power transistors.

22. A device according to claim 20, wherein said warning horn further includes a breaker operatively connected to the coil; wherein one of said MOS power transistors has a control terminal for connection to the breaker; and wherein another one of said MOS power transistors has a conduction terminal for connection to the coil.

23. A device according to claim 18, wherein at least a pair of said power components are power diodes.

24. A warning device for connection to a battery, the warning device comprising:
    a warning horn comprising a coil;
    a switch for selectively powering the coil from the battery; and
    a thermal protective circuit portion for connection between the battery and the warning horn for providing thermal protection by momentarily interrupting operation of the warning horn until excessive temperatures therein have dissipated, said thermal protective circuit portion comprising a bridge structure of power components.

25. A warning device according to claim 24, wherein at least one of said power components comprises means for thermal protection.

26. A warning device according to claim 24, wherein at least one pair of said power components are MOS power transistors.

27. A warning device according to claim 26, further comprising a charge pump for driving at least one of said MOS power transistors.

28. A warning device according to claim 26, wherein said warning horn further includes a breaker operatively connected to the coil; wherein one of said MOS power transistors has a control terminal for connection to the breaker; and wherein another one of said MOS power transistors has a conduction terminal for connection to the coil.

29. A warning device according to claim 24, wherein at least a pair of said power components are power diodes.

30. A warning device according to claim 24, further comprising a second circuit portion for connection between the battery and said thermal protective circuit portion to provide protection against reversal of battery polarity.

31. A method for driving a warning horn of a type comprising a coil, the method comprising the steps of:
    selectively powering the coil connected to a battery: and
    momentarily interrupting operation of the warning horn until excessive temperatures therein have dissipated using a thermal protective circuit portion connected between the battery and the warning horn, the thermal protective circuit portion comprising a bridge structure of power components.

32. A method according to claim 31, wherein at least one of said power components comprises means for thermal protection.

33. A method according to claim 31, wherein at least one pair of said power components are MOS power transistors.

34. A method according to claim 31, wherein at least a pair of said power components are power diodes.

35. A method according to claim 31, further comprising the step of providing protection against reversal of battery polarity.

* * * * *